Sept. 26, 1967   F. W. KOEPKE, JR., ET AL   3,343,656
ELEVATING AND LOWERING APPARATUS
Filed Oct. 25, 1966   5 Sheets-Sheet 5

*INVENTORS*
FREDERICK W. KOEPKE, Jr.
CARROLL A. TAYLOR
ORLAN M. ARNOLD

Curtis, Morris & Safford
ATTORNEYS

United States Patent Office 3,343,656
Patented Sept. 26, 1967

3,343,656
ELEVATING AND LOWERING APPARATUS
Frederick W. Koepke, Jr., Detroit, Carroll A. Taylor, Plymouth, and Orlan M. Arnold, Grosse Pointe Park, Mich., assignors to Ajem Laboratories, Inc., Livonia, Mich.
Filed Oct. 25, 1966, Ser. No. 589,320
11 Claims. (Cl. 198—219)

The present invention relates, in general, to apparatus for transporting articles from one location to another and, in particular, to equipment for elevating or lowering production parts. While this equipment is particularly useful in transporting automotive parts and will be considered, from time to time, in this connection, it will become readily apparent that this equipment has considerably broader application.

A common requirement in many manufacturing facilities is that production parts must be transferred from one level to another as they travel through a particular manufacturing operation. This change in elevation of the production parts may be necessitated because of the nature of the machine or processing operation to which the parts are being supplied or to avoid other equipment located in the direct path of movement of the parts or to cross over aisles.

Various mechanisms have been developed for elevating or lowering production parts, but none have proven entirely satisfactory particularly when considered in relation to the modern day requirements of speed, accuracy and efficiency. In one type of unit, a production part is deposited on a platform of an elevator and is either raised or lowered to the desired level. At this point, the part is unloaded from the elevator platform onto a horizontal transfer mechanism. This is followed by the elevator platform returning to its initial level to receive another part. The cycle is repeated and parts are delivered from the first level to the second level. Such a mechanism may be adequate when the production rate is low in that there is sufficient time to permit the platform to make the return trip to pick up new parts. However, when high production rates are required and parts are demanded to close sequence, this arrangement is unsatisfactory since parts cannot be delivered at a sufficiently fast rate. A good deal of time is lost as the elevator platform returns to its initial level. If the elevator speed is increased, other mechanical and control difficulties are likely to be encountered.

Other elevating and lowering mechanisms have been developed which employ multiple platforms on a chain system. However, it has been found that considerable difficulty is encountered in precisely aligning the platforms with the receiving and unloading stations. In addition, the chain system tends to wear, thereby making the alignment problem even more severe. Misalignment between the platforms and the receiving and unloading stations may result in serious jamming and damage to the equipment as well as damage to the parts being transported.

It is an object of the present invention to provide new and improved apparatus for raising and lowering articles.

It is another object of the present invention to provide such apparatus which is efficient in operation.

It is a further object of the present invention to provide elevating and lowering equipment which is not subject to misalignment problems common to presently available comparable equipment.

It is a further object of the present invention to provide elevating and lowering equipment which is capable of transferring production parts between two points at relatively high speeds.

It is yet another object of the present invention to provide elevating and lowering equipment which does not damage the articles being transferred.

These objects, as well as others, are achieved according to the present invention by apparatus which transports the articles from a receiving station at one level to an unloading station at another level through a series of incremental steps. A plurality of intermediate stations are provided between the receiving and unloading stations upon which the articles are deposited and from which the articles are removed in their movement through the equipment. The articles are moved from one station to the next by means of a plurality of movable platforms. Each movable platform moves back-and-forth between two successive stations.

In the specification and in the accompanying drawings there is described and shown an illustrative embodiment of the invention and various modifications thereof are suggested, but it is to be understood that this is not intended to be exhaustive, but on the contrary is given for purposes of illustration in order that others skilled in the art may fully understand the invention so that they may modify and adapt it in various forms, each as may be best suited to the conditions of a particular use.

The various objects, aspects and advantages of the present invention will be more fully understood from a consideration of the following specification in conjunction with the accompanying drawings in which.

Figure 1:
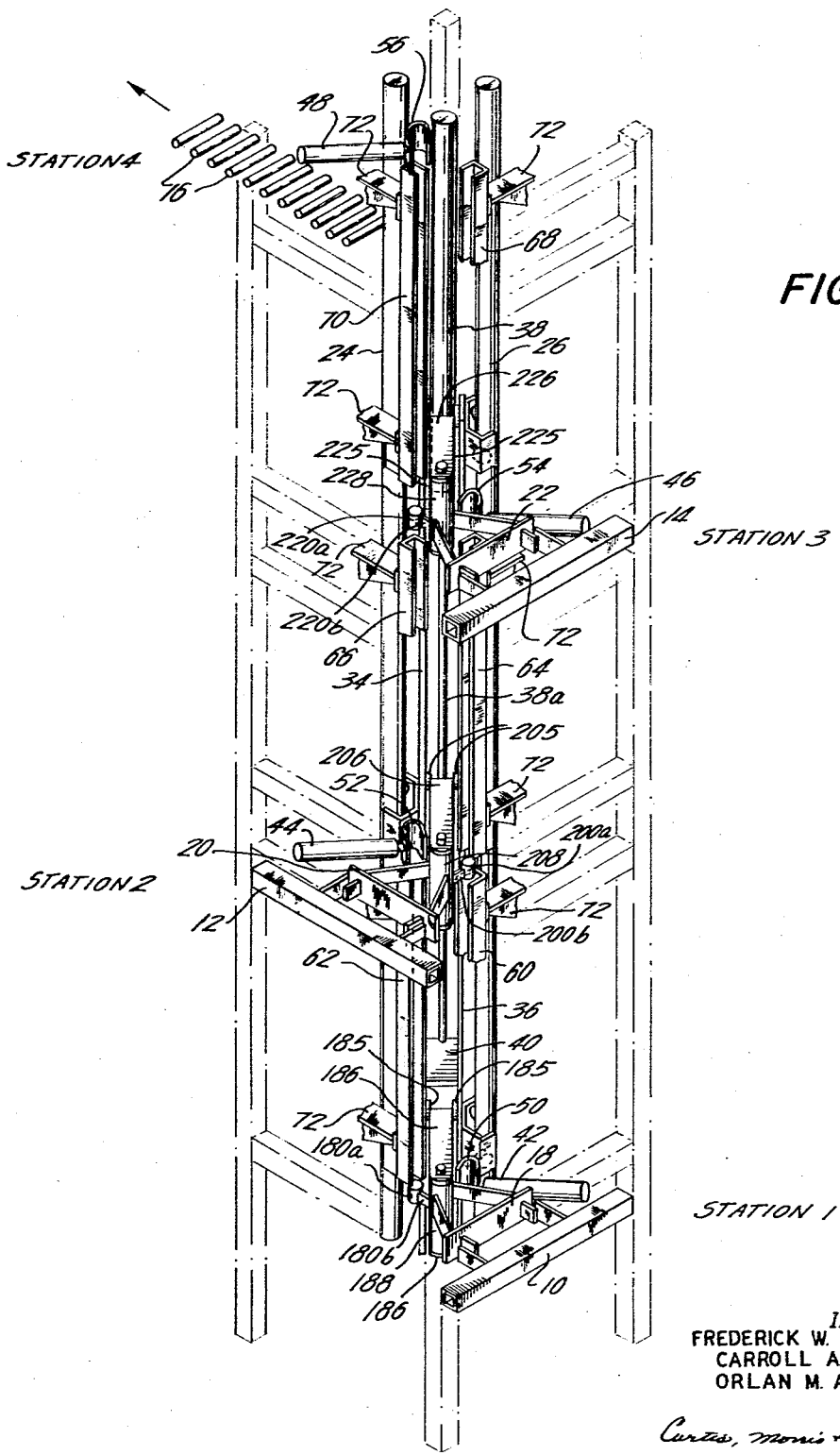
FIGURE 1 is a perspective view, partially in phantom, of elevating and lowering equipment constructed in accordance with the present invention.

Referring to FIGURE 1, apparatus constructed in accordance with the present invention for transporting articles vertically includes a plurality of stationary platforms 10, 12, 14 and 16 secured to a framework shown in phantom. From time to time, these platforms will be referred to as STATIONS 1, 2, 3 and 4, respectively. For an elevating operation, articles are received at STATION 1 and are unloaded at STATION 4. STATIONS 2 and 3 are intermediate stations at which the articles are deposited and from which the articles are removed in an intermittent manner as they are transported upward. The stationary platforms 10, 12, 14 and 16 are seen to be located at different elevations with alternate platforms being aligned vertically and successive platforms being angularly offset horizontally. For a lowering operation, articles are received at STATION 4 and are unloaded at STATION 1. In the embodiment of the invention illustrated, successive stationary platforms are equally spaced vertically and are offset by 90° horizontally. It will be apparent, however, that successive stationary platforms may be offset with respect to one another by different angles than 90°.

Articles received at STATION 1 or STATION 4 are moved through the equipment in incremental steps. This is accomplished by means of a plurality of movable platforms 18, 20 and 22 upon which the articles are transported from one stationary platform to the next. Each of the movable platforms 18, 20 and 22 is associated with two successive stationary platforms between which the movable platforms move back-and-forth. In particular, movable platform 18 moves between STATION 1 and STATION 2; movable platform 20 moves between STATION 2 and STATION 3; and movable platform 22 moves between STATION 3 and STATION 4.

In moving from one stationary platform to the next, the movable platforms 18, 20 and 22 undergo vertical and horizontal movements. The stationary and movable platforms are so arranged that the movable platforms may pass through the stationary platforms in a manner to be described hereinafter.

For an elevating operation, a movable platform, in moving from one stationary platform to the next, first undergoes an upward movement from a point just below its associated lower stationary platform through this lower stationary platform to an elevation just above the associated upper stationary platform. Then, the movable platform undergoes a 90° horizontal movement from vertical alignment with the associated lower stationary platform to a point just above the associated upper stationary platform. A downward movement through the associated upper stationary platform to an elevation just below the associated lower stationary platform followed by a 90° horizontal movement opposite to the first horizontal movement returns the movable platform to its starting point.

An article lifted from the associated lower stationary platform during the upward movement of the movable platform through this stationary platform is deposited on the associated upper stationary platform as the movable platform is moved downward through this associated upper stationary platform. The downward movement of the movable platform followed by the second horizontal movement positions the movable platform below the associated lower stationary platform so that another article may be moved upward. Once articles have been deposited on each of the stationary platforms, there is a simultaneous transporting of a plurality of articles by the movable platforms from one stationary platform to the next successive stationary platform. Upward and downward movements of the movable platforms occur simultaneously as do horizontal movements of the movable platforms. However, successive movable platforms move in opposite directions horizontally.

For a lowering operation, a movable platform, in moving from one stationary platform to the next, first undergoes an upward movement from a point just below the associated upper stationary platform through this upper stationary platform to a point just above this upper stationary platform. Then the movable platform undergoes a 90° horizontal movement from vertical alignment with the associated upper stationary platform to vertical alignment with the associated lower stationary platform. A downward movement through the associated lower stationary platform to a point just below the associated lower stationary platform followed by a 90° horizontal movement opposite to the first horizontal movement returns the movable platform to vertical alignment with the associated upper stationary platform. An upward movement of the movable platform returns this platform to its starting point.

Figure 2:
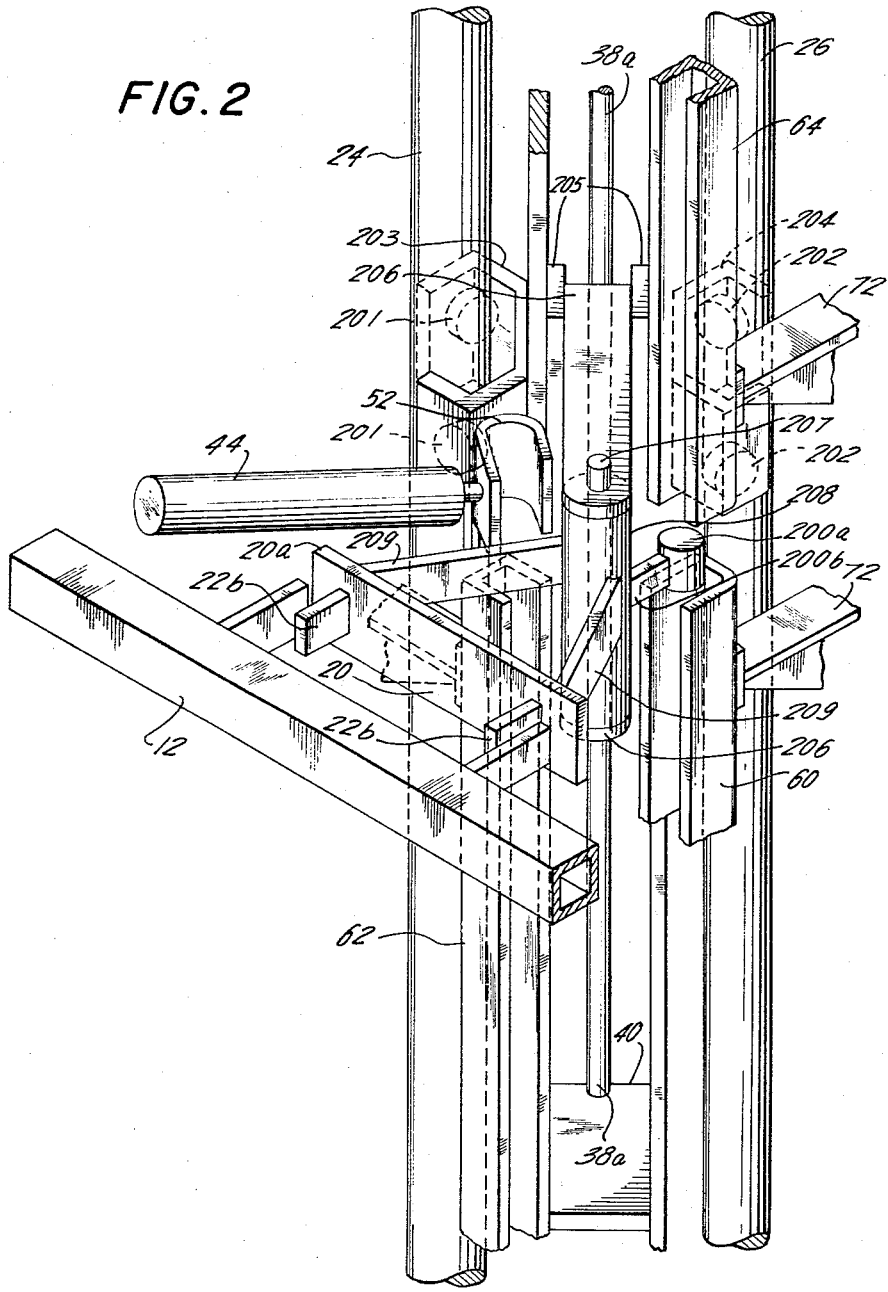
FIGURE 2 is a perspective view, on an enlarged scale, of a portion of the equipment of FIGURE 1.
Figure 3:
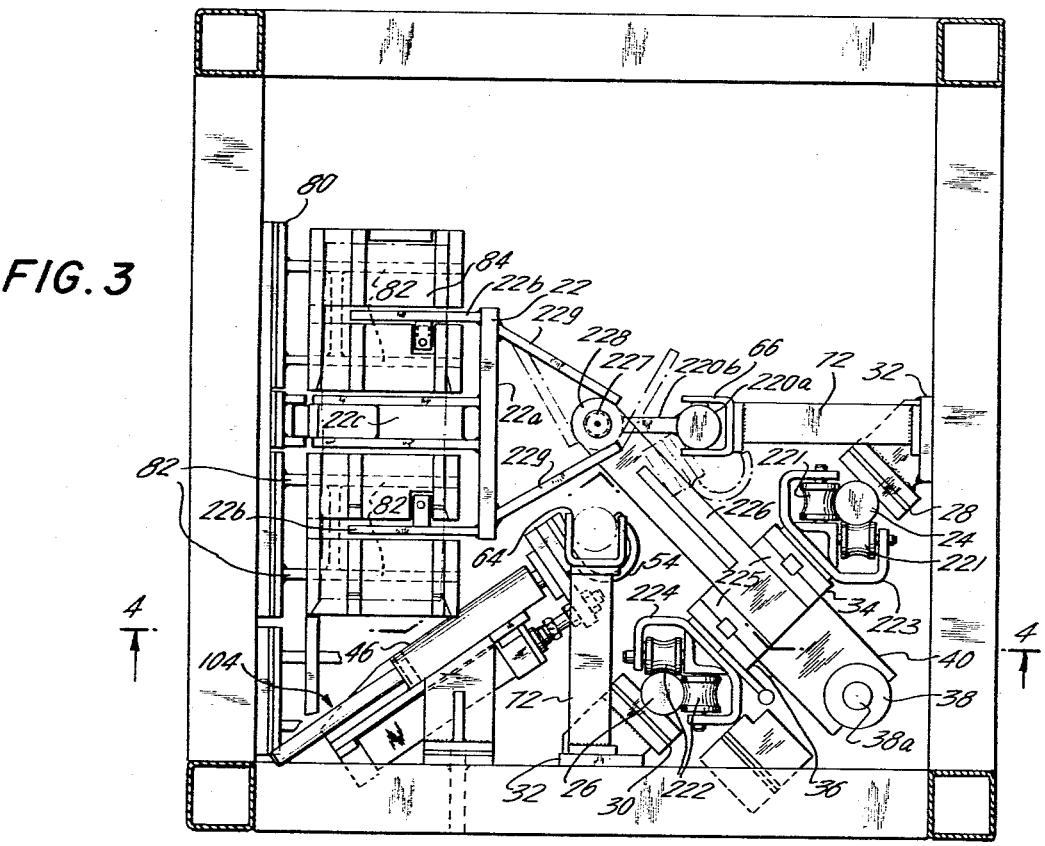
FIGURE 3 is a horizontal section of an intermediate station of the equipment of FIGURE 1.
Figure 4:
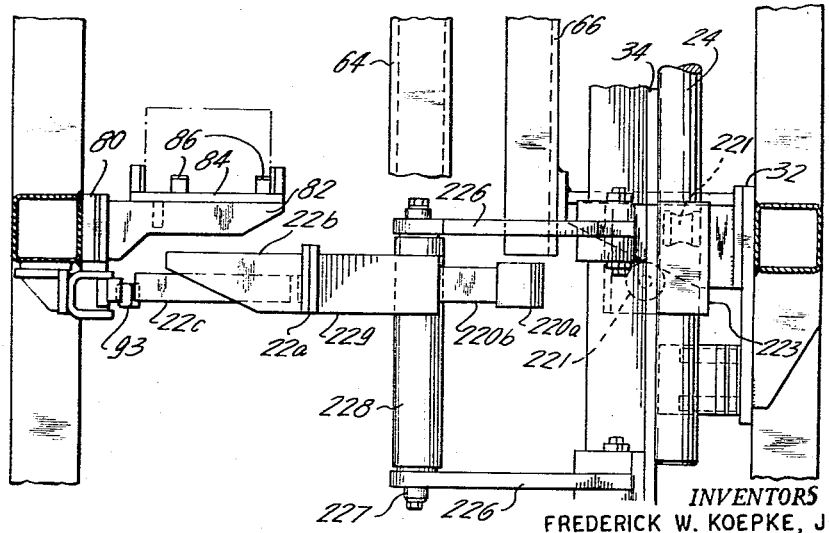
FIGURE 4 is a vertical section taken along line 4—4 of FIGURE 3.

FIGURES 2, 3 and 4 show the details of the mechanisms which impart the required movements to the movable platforms 18, 20 and 22 as well as the manner in which the movable platforms pass through the associated stationary platforms. FIGURE 2 is a perspective view of the equipment in the vicinity of stationary platform 12 and illustrates the manner in which movable platform 20 passes through stationary platform 12. FIGURES 3 and 4 are horizontal and vertical sections, respectively, of the equipment in the vicinity of stationary platform 14. It will become apparent that the other stationary and movable platforms are arranged similar to those illustrated in FIGURES 2, 3 and 4 so that additional views of these other platforms are unnecessary. FIGURE 2, as well as FIGURE 1, is a view of the equipment from the lower left-hand corner of FIGURE 3. Elements in FIGURES 2, 3 and 4 particularly associated with a movable platform have been assigned three digit reference numerals with the first two digits being the same as the associated movable platform. The third digits of these reference numerals correspond to the different elements themselves.

Referring to FIGURES 2, 3 and 4, a pair of guide rods 24 and 26, extending parallel to each other, is located in one corner of the framework of the equipment. The guide rods 24 and 26 are secured to the framework by means of a plurality of flat bars 28 and 30, respectively, and a plurality of angle supports 32. The guide rods 24 and 26 are approximately equal in length to the height of the equipment while the flat bars 28 and 30 are of selected lengths. The angle supports 32 are located at selected elevations of the framework.

In the following description, specific reference will be made to FIGURES 3 and 4. However, when reference is made to any element in FIGURES 3 and 4 associated with stationary platform 14 or movable platform 22, the reference numeral of the corresponding element in FIGURE 2 associated with stationary platform 12 or movable platform 20 will be indicated in parentheses. The guide rods 24 and 26 are engaged by pairs of guide rollers 221 (201) and 222 (202), respectively. The guide rollers 221 (201) and 222 (202) are held in guide roller frames 223 (203) and 224 (204), respectively, in such a manner that the guide rollers of each pair are offset vertically, as most clearly shown in FIGURE 4, and engage the guide rods at 90°, as most clearly shown in FIGURE 3. A vertically extending flat bar 34 serves to secure one roller frame of each pair of roller frames together and a second vertically extending flat bar 36 serves to secure the three remaining roller frames together. The flat bars 34 and 36, in turn, are secured together by pairs of vertical flat bars and pairs of horizontal arms, one pair of such vertical flat bars and one pair of such horizontal arms being associated with each movable platform. As shown in FIGURES 3 and 4, two flat bars 225 (205) are individually secured to flat bars 34 and 36 and the gap between the flat bars 225 (205) is bridged by a pair of horizontal arms 226 (206). The horizontal arms 226 (206) extend inward toward the center of the equipment and support a shaft 227 (207) at their inner ends. The shaft 227 (207) is rigidly secured to the arms 226 (206). A rotatable shaft 228 (208) is mounted on the shaft 227 (207) for rotation about shaft 227 (207). FIGURE 1 shows portions of the assembly just described at each of the three levels of the movable platforms 18, 20 and 22. Because of the coupling together of the various components associated with the movable platforms, all these components including the rotatable shafts 188, 208 and 228, move upward and downward together along the guide rods 24 and 26. Upward and downward movements are imparted to these components by an actuator 38 secured to the framework by suitable means not shown. Actuator 38 may be a hydraulic cylinder, for example. The moving arm 38a of actuator 38 is fixed to a plate 40 which extends between the flat bars 34 and 36 and is rigidly secured to these flat bars.

The movable platform 22 (20) includes a lift bar 22a (20a) and a set of fingers 22b (20b) secured to the lift bar 22a (20a). The fingers 22b (20b) are arranged to pass through slots in the stationary platform 14 (12). Located at the center of lift bar 22a (20a) is a guide member 22c (corresponding element on movable platform 20 not shown) which is also arranged to pass through a slot in stationary platform 14 (12). The structure of the stationary platforms 10, 12, 14 and 16 will be described in detail hereinafter. The guide member 22c serves to center and position the movable platform 22 (20) when an article is being deposited on stationary platform 14 (12) or being lifted off of this stationary platform.

A pair of bracket arms 229 (209) are secured to the lift bar 22a (20a) on the surface opposite from the one to which the fingers 22b (20b) are secured. The bracket arms 229 (209) extend in a V shape toward the center of the equipment and are secured to the rotatable shaft 228 (208). Thus, as the rotatable shafts 188, 208, and 228 are moved upward and downward by the drive imparted from actuator 38, the movable platforms 18, 20 and 22 also move upward or downward together.

Horizontal movements are imparted to the movable platforms 18, 20 and 22 by means of four actuators 42, 44, 46 and 48 which also may be hydraulic cylinders. One such actuator is provided for each of the stationary platforms 10, 12, 14 and 16. At the free ends of the moving arms of the actuators 42, 44, 46 and 48 are U shaped cups 50, 52, 54 and 56, respectively. These cups 50, 52, 54 and 56 are shaped and dimensioned to engage knobs 180a, 200a and 220a which are secured to rotatable shafts 188, 208 and 228, respectively, by short arms 180b, 200b and 220b, respectively. The arrangement of the actuators 42, 44, 46 and 48 and the knobs 180a, 200a and 220a is such that when the knobs are properly positioned with respect to the stationary platforms 10, 12, 14 and 16, the knobs may be engaged by the cups 50, 52, 54 and 56. As a result when the corresponding actuators are activated, the knobs are moved by the actuators causing the associated movable platforms 18, 20 and 22 to move horizontally about the axis of the associated rotatable shafts 188, 208 and 228. For the particular arrangement shown in FIGURE 1, actuator 42 drives only movable platform 18 and actuator 48 drives only movable platform 22. On the other hand, actuator 44 drives both movable platform 18 and movable platform 20 and actuator 46 drives both movable platform 20 and movable platform 22.

The movable platforms 18, 20 and 22 are shown at their associated lower stationary platforms in FIGURE 1. In operation, the movable platforms are moved vertically from the positions shown in FIGURE 1 to elevations just above the next higher stationary platforms. Such movements position knob 180a associated with movable platform 18 within cup 52 at stationary platform 12, knob 200a associated with movable platform 20 within cup 54 at stationary platform 14, and knob 220a associated with movable platform 22 within cup 56 at stationary platform 16. At this point actuators 44, 46 and 48 are activated to push knobs 180a, 200a and 220a. Actuator 46 in FIGURE 3, typical of the other actuators, extends to the position shown by the broken lines. As this occurs, the knob slides out of the cup 54 to the edge of the cup. This permits retracting the cup 54 to its starting position after the knob is at its new location without drawing the knob back also. As a result, movable platform 18 turns 90° clockwise, as viewed from the top of the equipment, movable platform 20 turns 90° counterclockwise, and movable platform 22 turns 90° clockwise. These horizontal movements position movable platforms 18, 20 and 22 just above stationary platforms 12, 14 and 16, respectively. Because rotatable shafts 188, 208 and 228 are aligned vertically, the movable platforms turn about the same vertical axis, although successive movable platforms turn in opposite directions.

The movable platforms 18, 20 and 22 then are moved downward through stationary platforms 12, 14 and 16 to elevations just below the next lower stationary platforms. These downward movements position knob 180a within cup 50 at stationary platform 10, knob 200a within cup 52 at stationary platform 12, knob 220a within cup 54 at stationary platform 14. At this point actuators 42, 44 and 46 are activated to push knobs 180a, 200a and 220a. As a result, movable platform 18 turns 90° counterclockwise, movable platform 20 turns 90° clockwise, and movable platform 22 turns 90° counterclockwise. These horizontal movements position movable platforms 18, 20 and 22 just below stationary platforms 10, 12 and 14, respectively. The cups 50, 52 and 54 then are retracted to their starting positions. The movable platforms 18, 20 and 22 then may be moved upward to repeat the cycle just described.

A plurality of channels 60, 62, 64, 66, 68 and 70 are provided to position the movable platforms 18, 20 and 22 for proper movement through their associated stationary platforms and to guide the knobs 180a, 200a and 220a as they enter into and move out of the cups 50, 52, 54 and 56. The channels 60–70 are secured to the framework by brackets 72.

As the movable platforms 18, 20 and 22 move from one stationary platform to the next, the knobs 180a, 200a and 220a slide inside channels 60–70. When the movable platforms reach the prescribed elevations just above or just below their associated stationary platforms, the knobs 180a, 200a and 220a leave the respective channels 60–70 and enter into the cups 50, 52, 54 and 56 which are positioned between and in alignment with the channels 60–70. After the movable platforms have been rotated 90° to their new positions, the cups 50, 52, 54 and 56 are positioned between and in alignment with different ones of the channels 60–70 so that the knobs 180a, 200a and 220a are guided into the respective channels 60–70.

The mechanisms for guiding the movable platforms through the stationary platforms now will be described in connection with a description of the details of the stationary platforms 10, 12 and 14. Stationary platform 16 will be considered in greater detail hereinafter.

Referring to FIGURES 3 and 4 which show the details of stationary platform 14, this pltaform is seen to include a support beam 80, secured to the framework, and a plurality of support arms 82 extending into the equipment from the support beam. A slotted table 84 is positioned atop the support arms 82 and secured to the support arms. The slots in the table 84 are so located that the fingers 22b and the guide member 22c of the movable platform 22 may pass through the table. In order to hold an article securely in place and to prevent its being pushed off of the stationary platform, perch pins 86 may be provided which extend upward and engage selected holes in the article. Likewise other pins may be provided on the movable platform 22 which engage another set of holes in the article so as to transport the article more securely and to position it more precisely on the next stationary platform.

Figure 6:
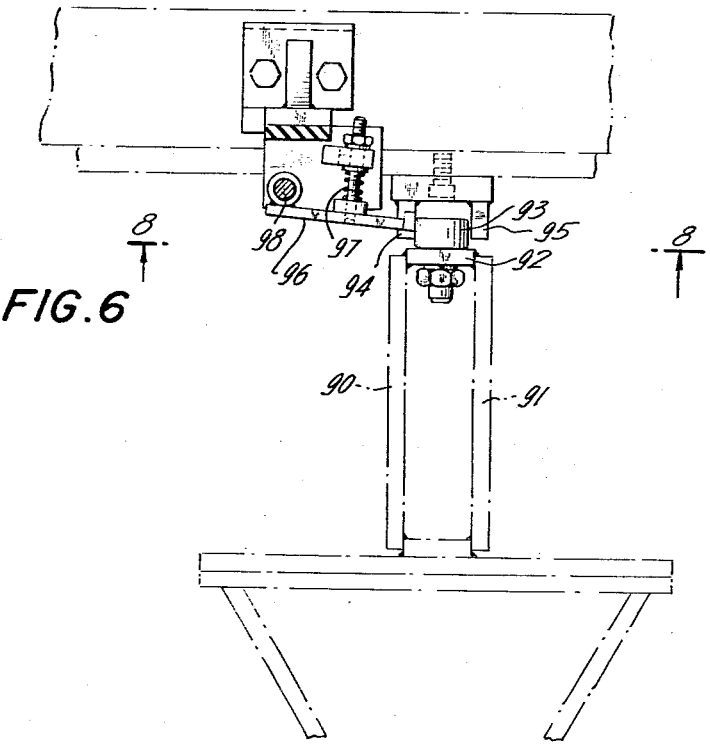
FIGURES 6, 7 and 8 are detailed, enlarged views of a portion of the equipment of FIGURE 1.
Figure 7:
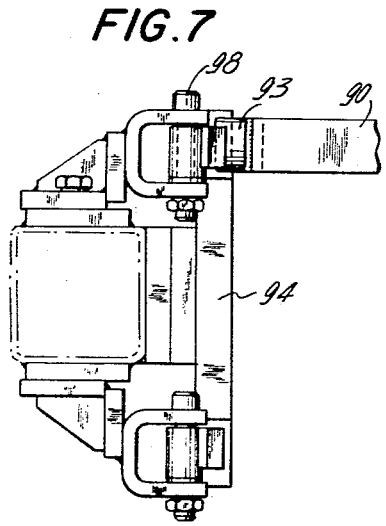
Figure 8:
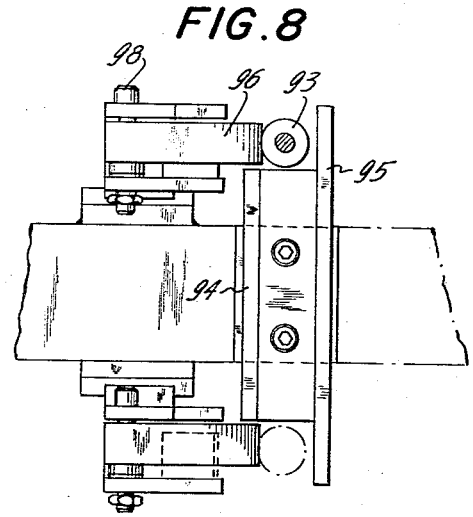

FIGURE 6 is a plan view illustrating the details of the mechanisms for guiding the movable platforms through the stationary platforms. FIGURE 7 is a side elevation view of the assembly of FIGURE 6, while FIGURE 8 is a vertical section taken along line 8—8 of FIGURE 6. The specific assembly shown in FIGURES 6, 7 and 8 is arranged for clockwise movements of the movable platform as viewed from FIGURE 6. Referring to FIGURES 4, 6, 7 and 8, the guide member 22c at the center of the movable platform 22 includes a pair of bars 90 and 91 extending outward toward the framework and an end member 92 at which a roller 93 is supported. FIGURE 4 shows the movable platform below the stationary platform, while FIGURES 6, 7 and 8 show the movable platform above the stationary platform. Two guide mechanisms, similarly arranged, are provided at each stationary platform for both upward and downward movements of the movable platforms.

Roller 93 moves upward and downward between a pair of guide strips 94 and 95 which extend vertically. As shown in FIGURE 8 guide strip 94 is shorter than guide strip 95. As the movable platform moves clockwise in FIGURE 6, the roller 93 hits against a spring loaded cam lock 96. Continued movement of the roller 93 in the same direction forces cam lock 96 to rotate counterclockwise, as viewed in FIGURE 6, about a pivot pin 98 against the action of a spring 97. As soon as roller 93 passes beyond the edge of cam lock 96 and over guide strip 94, the cam lock springs forward and the roller is captive between the edge of the cam lock and guide strip 95. A downward movement of the movable platform is guided by the travel of roller 93 between the guide strips 94 and 95. As shown in FIGURES 4, 7 and 8, a similar arrangement is provided below the stationary platform.

Figure 5:
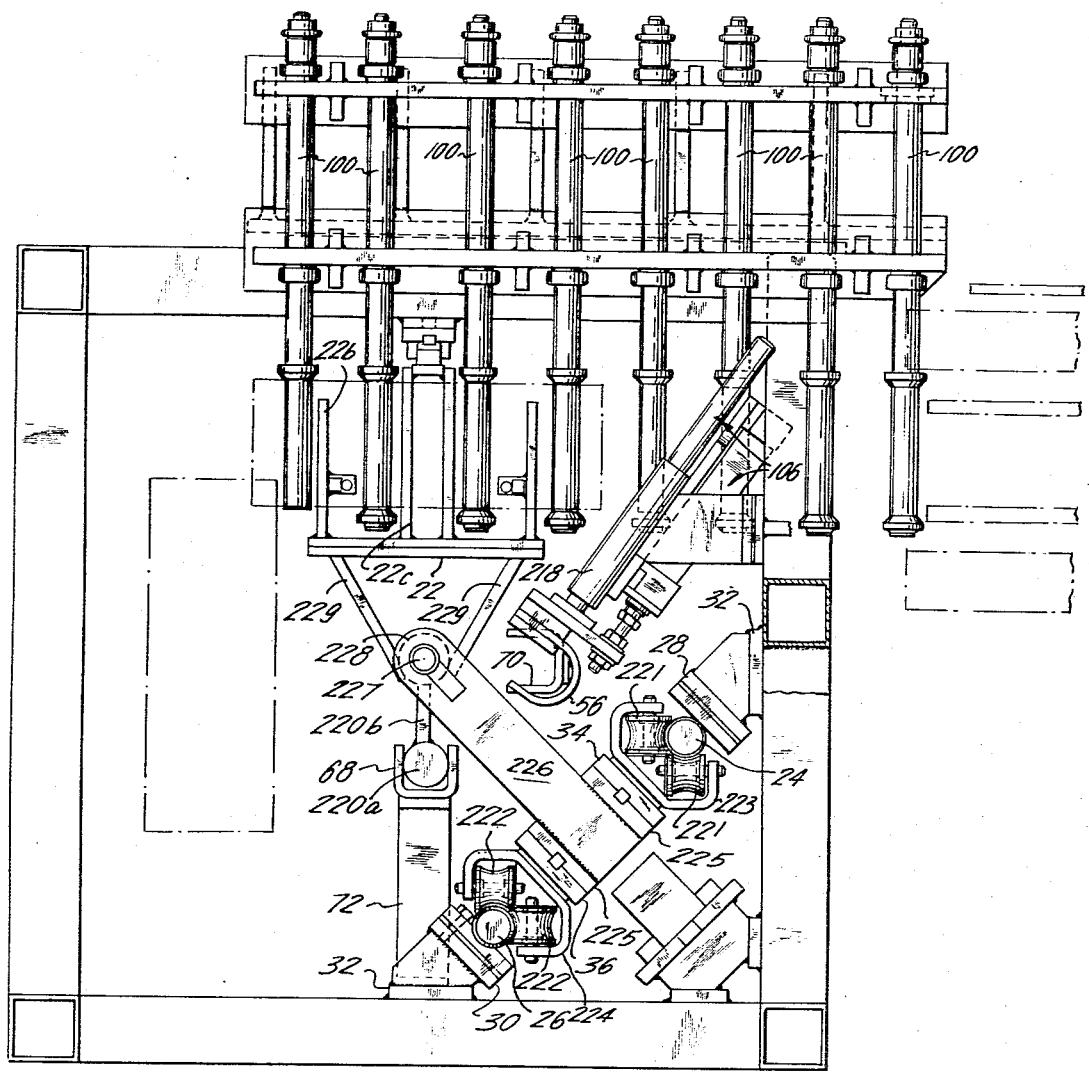
FIGURE 5 is a top view of the equipment of FIGURE 1.

FIGURE 5 shows the details of stationary platform 16. This platform is seen to include a plurality of rollers 100 which may be individually free to roll or they may be synchronously connected as with a chain or with gears. The rollers 100 are spaced so that the fingers 22b and the guide member 22c of movable platform 22 may pass through. An article transported to stationary platform 16 is deposited on this platform as the movable platform 22 passes downward through the rollers 100. With the article settled on the rollers 100, the roller drive is energized and the article is removed from stationary platform 16.

After an article has been elevated to the desired level, it may go through the particular operation for which it was raised or it may simply travel a prescribed distance at this level to pass over an aisle or obstacle. At some point it may be desired to lower this article. Apparatus similar to that described may be employed for this purpose. It is apparent that a lowering operation will be the reverse of the elevating operation already described.

Although the invention has been described as having four stations, it will be apparent that the number of stations actually used is dependent upon the particular application. In addition, the spacing between stations is dependent upon the particular application. Generally, the number of stations and their spacing is governed by the rate at which the articles are being handled, the nature of the article, and the dimensions of the article. In order to handle articles such as engine heads or other machined parts, precision is required in their positioning and movement so as to prevent the articles from being damaged. The present invention has been found to satisfy these requirements.

In order to prevent the moving arms of actuators 42, 44, 46 and 48 from rotating, whereby the cups 50, 52, 54 and 56 would be oriented improperly to receive the knobs 180a, 200a and 220a, binocular arrangements are employed in the usual way to maintain the proper orientation of the moving arms. Two such binocular arrangements 104 and 106 are shown in FIGURES 3 and 5, respectively, associated with actuators 46 and 48, respectively.

Although the actuators 38, 42, 44, 46 and 48 have been described as hydraulic cylinder, it will be apparent that other comparable components may be employed. For example, pneumatic cylinders and electric actuating devices may be used to perform the desired functions.

While there has been described what is at present considered to be the preferred embodiment of this invention it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for transporting articles vertically comprising:
   a plurality of stationary platforms upon which said articles are deposited and from which said articles are removed, said stationary platforms being located at different elevations with alternate stationary platforms being aligned vertically and successive stationary platforms being offset horizontally;
   a plurality of movable platforms upon which said articles are transported from one stationary platform to the next, each of said movable platforms movable back-and-forth between two successive stationary platforms;
   means for moving said movable platforms vertically between successive stationary platforms;
   and means for moving said movable platforms horizontally from vertical alignment with one stationary platform to vertical alignment with the next successive stationary platform.

2. Apparatus for transporting articles vertically comprising:
   a plurality of stationary platforms upon which said articles are deposited and from which said articles are removed, said stationary platforms being located at different elevations with alternate stationary platforms being aligned vertically and successive stationary platforms being angularly offset horizontally;
   a plurality of movable platforms upon which said articles are transported from one stationary platform to the next, each of said movable platforms movable back-and-forth between two successive stationary platforms;
   means for moving said movable platforms vertically between successive stationary platforms;
   and means for moving said movable platforms horizontally from vertical alignment with one stationary platform to vertical alignment with the next successive stationary platform.

3. Apparatus for transporting articles vertically comprising:
   a plurality of stationary platforms upon which said articles are deposited and from which said articles are removed as said articles are being transported vertically, said stationary platforms being located at selected elevations and staggered horizontally;
   a plurality of movable platforms upon which said articles are transported from one stationary platform to the next, each of said movable platforms associated with and movable between two stationary platforms;
   means for moving said movable platforms vertically between their associated stationary platforms;
   and means for moving said movable platforms horizontally from vertical alignment with one of their associated stationary platforms to vertical alignment with the other of their associated stationary platforms.

4. Apparatus according to claim 3 wherein said stationary platforms are mounted upon a framework with successive stationary platforms being angularly offset horizontally and said movable platforms are mounted for rotary horizontal movement within said framework.

5. Apparatus according to claim 3 wherein said movable platforms include a plurality of parallel fingers and said stationary platforms are formed to permit said parallel fingers of said movable platforms to pass vertically through said stationary platforms.

6. Apparatus according to claim 5 wherein the stationary platform from which said articles are unloaded includes a plurality of rollers spaced apart and disposed parallel to each other.

7. Apparatus for transporting articles vertically comprising:
   a plurality of stationary platforms upon which said articles are deposited and from which said articles are removed, said stationary platforms being equally spaced vertically with alternate stationary platforms being aligned vertically and successive stationary platforms being angularly offset horizontally;
   a plurality of movable platforms upon which said articles are transported from one stationary platform to the next, each of said movable platforms associated with two successive stationary platforms between which said movable platforms move back-and-forth;
   means for mounting said movable platforms at equal vertical spacings equal to the spacing between successive stationary platforms, said movable platforms being coupled together on said mounting means for unitary vertical movements of said movable platforms and individual horizontal movements of said movable platforms;
   means for moving said movable platforms simultaneously between an elevation just above the associated upper stationary platforms and an elevation just below the associated lower stationary platforms;

and means for individually moving said movable platforms horizontally from vertical alignment with one associated stationary platform to vertical alignment with the second associated stationary platform when said movable platforms are at said elevations just above the associated upper stationary platforms and just below the associated lower stationary platforms.

8. Apparatus according to claim 7 wherein said movable platforms move horizontally about the same vertical axis.

9. Apparatus according to claim 8 wherein said stationary platforms are slotted and said movable platforms include a set of fingers positioned to pass vertically between the slots of said stationary platforms.

10. Apparatus according to claim 9 wherein said means for moving said movable platforms horizontally include a plurality of actuators, one associated with each stationary platform, and each of said movable platforms further include a projection engaged by the actuators associated with the stationary platforms between which the movable platform moves for swinging the movable platform about said vertical axis.

11. Apparatus according to claim 10 wherein each of said stationary platforms further include a vertically disposed guide passage and each of said movable platforms further include a guide member adapted to be received in the guide passages of the associated stationary platforms.

References Cited

UNITED STATES PATENTS

| | | | |
|---|---|---|---|
| 1,794,331 | 2/1931 | Klyver et al. | 198—156 X |
| 2,915,204 | 12/1959 | Alimanestiano | 198—219 X |
| 3,204,785 | 9/1965 | Bajulaz | 214—16.1 |
| 3,250,377 | 5/1966 | Minichello et al. | 198—38 |

FOREIGN PATENTS

| | | |
|---|---|---|
| 1,374,238 | 8/1964 | France. |
| 25,380 | 12/1905 | Great Britain. |

EVON C. BLUNK, *Primary Examiner.*

R. J. HICKEY, *Assistant Examiner.*